US012611931B2

(12) United States Patent　　　(10) Patent No.:　US 12,611,931 B2

Jiang et al.　　　　　　　　　　　(45) Date of Patent:　　Apr. 28, 2026

(54) HEAD UP DISPLAY GLASS AND HEAD UP DISPLAY SYSTEM

(71) Applicant: FUYAO GLASS INDUSTRY GROUP CO., LTD., Fuqing (CN)

(72) Inventors: Bingming Jiang, Fuqing (CN); Jinliang Guan, Fuqing (CN); Zhixin Chen, Fuqing (CN); Canzhong Zhang, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 277 days.

(21) Appl. No.: 18/375,767

(22) Filed: Oct. 2, 2023

(65) Prior Publication Data

US 2024/0025156 A1　　Jan. 25, 2024

Related U.S. Application Data

(63) Continuation of application No. PCT/CN2022/086958, filed on Apr. 15, 2022.

(30) Foreign Application Priority Data

Apr. 16, 2021　(CN) .......................... 202110416008.6

(51) Int. Cl.
　　 *B60K 35/23*　　　(2024.01)
　　 *B32B 17/10*　　　(2006.01)
　　　　　(Continued)

(52) U.S. Cl.
　　 CPC ........ *B60K 35/23* (2024.01); *B32B 17/10036* (2013.01); *B32B 17/10201* (2013.01);
　　　　　(Continued)

(58) Field of Classification Search
　　 None
　　 See application file for complete search history.

(56) References Cited

U.S. PATENT DOCUMENTS

2017/0242247 A1　8/2017　Tso et al.
2019/0064516 A1　2/2019　Wagner et al.
　　　　　(Continued)

FOREIGN PATENT DOCUMENTS

CN　　　102164744 A　　8/2011
CN　　　105842850 A　　8/2016
　　　　　(Continued)

OTHER PUBLICATIONS

Notice of Reasons for Refusal dated Oct. 28, 2024 received in Japanese Patent Application No. JP 2023-561243.
　　　　　(Continued)

*Primary Examiner* — Phu Vu

(74) *Attorney, Agent, or Firm* — Scully, Scott, Murphy & Presser, P.C.

(57)　　　　　ABSTRACT

A head up display glass and a head up display system are provided. The head up display glass includes an outer glass sheet, an inner glass sheet, an intermediate layer, a transparent conducting coating, and an enhanced reflection coating. The outer glass sheet has a first surface and a second surface opposite the first surface. The inner glass sheet has a third surface and a fourth surface opposite the third surface. The second surface faces the third surface. The intermediate layer is disposed between the second surface and the third surface. The transparent conducting coating is disposed on the second surface or the third surface. The enhanced reflection coating is disposed on the fourth surface. The transparent conducting coating has a reflectivity for P-polarized light not less than 6%. The enhanced reflection coating has a reflectivity for P-polarized light not less than 10%.

20 Claims, 6 Drawing Sheets

(51) Int. Cl.
    *B60K 35/00*       (2024.01)
    *G02B 27/01*       (2006.01)

(52) U.S. Cl.
    CPC .. *B32B 17/10229* (2013.01); *B32B 17/10568*
        (2013.01); *G02B 27/0101* (2013.01); *B32B*
      *2307/418* (2013.01); *B32B 2307/42* (2013.01);
          *B32B 2457/20* (2013.01); *B60K 35/00*
        (2013.01); *G02B 2027/0194* (2013.01)

(56)           References Cited

U.S. PATENT DOCUMENTS

| | | | | |
|---|---|---|---|---|
| 2021/0011286 A1* | 1/2021 | Morohashi | .............. | B60R 11/02 |
| 2021/0018749 A1* | 1/2021 | Fischer | ............. | B32B 17/10568 |

FOREIGN PATENT DOCUMENTS

| | | | |
|---|---|---|---|
| CN | 106630688 A | 5/2017 | |
| CN | 108407580 A | 8/2018 | |
| JP | 2015507600 A | 3/2015 | |
| JP | 2017538141 A | 12/2017 | |
| JP | 2019182738 A | 10/2019 | |
| JP | 2020532763 A | 11/2020 | |
| JP | 2021508378 A | 3/2021 | |
| KR | 20200121866 A | 10/2020 | |
| WO | 2019156030 A1 | 8/2019 | |
| WO | 2019179683 A1 | 9/2019 | |

OTHER PUBLICATIONS

Extended European search report dated Aug. 6, 2024 received in European Patent Application No. 22779184.5.

International Search Report dated Jul. 15, 2022 issued in PCT/CN2022/086958.

Chinese First Office Action dated Oct. 20, 2021 issued in CN application No. 202110416008.6.

Request for the Submission of an Opinion issued in corresponding KR application No. 10-2023-7034810 dated Jul. 5, 2025.

Notice of Final Rejection issued in corresponding KR application No. 10-2023-7034810 dated Dec. 29, 2025.

\* cited by examiner

HEAD UP DISPLAY GLASS AND HEAD UP DISPLAY SYSTEM

CROSS-REFERENCE TO RELATED APPLICATION(S)

This application is a continuation of International Patent Application No. PCT/CN2022/086958, filed Apr. 15, 2022, which claims priority to Chinese Patent Application No. 202110416008.6, filed Apr. 16, 2021, the disclosures of which are hereby incorporated by reference in their entireties.

TECHNICAL FIELD

The disclosure relates to the technical field of head up display, and in particular, to a head up display glass and a head up display system.

BACKGROUND

With the development of automotive industry, a head up display function of a windshield of a vehicle has become an important factor of vehicle purchasing of consumers. A conventional head up display glass is coated with a reflective coating, and an image projected by a projection unit is reflected by the coating to human eyes.

However, since the reflective coating is set to have a limited reflectivity to ensure that a transmittance of the conventional head up display glass meets a national standard, an image observed by human eyes is low in brightness and vague, resulting in poor display effect.

SUMMARY

A head up display glass and a head up display system are provided in the disclosure, which aim to improve a reflectivity of the head up display glass, improve sharpness of a head up display image, and enhance head up display effect.

To achieve the objectives of the disclosure, the following technical solutions are provided in the disclosure.

In a first aspect, a head up display glass is provided in the disclosure. The head up display glass includes an outer glass sheet, an inner glass sheet, an intermediate layer, a transparent conducting coating, and an enhanced reflection coating. The outer glass sheet has a first surface and a second surface opposite the first surface. The inner glass sheet has a third surface and a fourth surface opposite the third surface. The second surface faces the third surface. The intermediate layer is disposed between the second surface and the third surface. The transparent conducting coating is disposed on the second surface or the third surface. The enhanced reflection coating is disposed on the fourth surface. The transparent conducting coating has a reflectivity for P-polarized light not less than 6%. The enhanced reflection coating has a reflectivity for P-polarized light not less than 10%. The head up display glass has a reflectivity for P-polarized light not less than 15%.

In an embodiment, the transparent conducting coating includes multiple dielectric layers and multiple metal layers. A number of the multiple metal layers is not less than three. Each of the multiple metal layers is disposed between two of the multiple dielectric layers.

In an embodiment, the metal layer is made of any one metal or any one metal alloy of silver (Ag), gold (Au), copper (Cu), aluminum (Al), or platinum (Pt).

In an embodiment, the metal layer is made of an alloy of Ag and at least one of Au, Cu, Al, or Pt.

In an embodiment, the transparent conducting coating is provided with at least two busbars. The at least two busbars are electrically connected to a power supply of 12 V to 60 V, to enable the transparent conducting coating to generate heat.

In an embodiment, the transparent conducting coating has a sheet resistance ranging from 0.5Ω/□ to 0.9Ω/□.

In an embodiment, the enhanced reflection coating includes a high refractive-index layer and a low refractive-index layer stacked sequentially outwards from the fourth surface. The high refractive-index layer has a refractive index not less than 1.8. The low refractive-index layer has a refractive index not greater than 1.6.

In an embodiment, a number of the high refractive-index layer is not less than one, and at least one of the high refractive-index layer includes two high refractive-index sub-layers. One of the two high refractive-index sub-layers has a refractive index ranging from 1.9 to 2.2, and the other of the two high refractive-index sub-layers has a refractive index greater than or equal to 2.3.

In an embodiment, a number of the high refractive-index layer is not less than one, and at least one of the high refractive-index layer includes at least two high refractive-index sub-layers. A number of the low refractive-index layer is not less than one, and at least one of the low refractive-index layer includes at least two low refractive-index sub-layers.

In an embodiment, the intermediate layer has a wedge-shaped cross section. The wedge-shaped cross section has a wedge angle ranging from 0.05 milli-radians (mrad) to 0.6 mrad.

In an embodiment, the wedge angle of the wedge-shaped cross section ranges from 0.1 mrad to 0.18 mrad.

In an embodiment, the wedge angle of the wedge-shaped cross section ranges from 0.45 mrad to 0.55 mrad.

In an embodiment, the reflectivity of the transparent conducting coating for P-polarized light is R1, the reflectivity of the enhanced reflection coating for P-polarized light is R2, and the reflectivity of the head up display glass for P-polarized light is R3, where R3≥R2+10%*R1.

In an embodiment, the outer glass sheet is a tinted glass sheet having a visible light transmittance not less than 70%.

In an embodiment, the inner glass sheet is a clear glass sheet having a visible light transmittance not less than 90%.

In an embodiment, the inner glass sheet has a thickness not greater than 1.4 mm.

In a second aspect, a head up display system is provided in the disclosure. The head up display system includes a projection unit and the head up display glass of any one of embodiments in the first aspect. The projection unit is configured to generate P-polarized light that is incident on the enhanced reflection coating at an angle of incidence ranging from 55° to 75°.

In an embodiment, the head up display glass has a reflectivity for the P-polarized light not less than 19%.

In an embodiment, a proportion of P-polarized light in light rays generated by the projection unit is 100%.

In an embodiment, the P-polarized light is configured to be reflected by the enhanced reflection coating to form a first head up display image and is configured to be reflected by the transparent conducting coating to form a second head up display image. The head up display glass enables at least 80% area of the first head up display image to superimpose at least 80% area of the second head up display image.

In an embodiment, the projection unit is configured to generate, through the head up display glass, a head up display image with a projection distance not longer than 5 meters and a head up display image with a projection distance longer than or equal to 10 meters.

With the head up display glass provided in the disclosure, the P-polarized light can be reflected by the enhanced reflection coating to form the first head up display image that serves as a primary image, and can be refracted by the enhanced reflection coating and be reflected by the transparent conducting coating to form the second head up display image that serves as a secondary image, so that the primary image can superimpose the secondary image, thereby increasing P-polarized light rays of a head up display image that enters human eyes. Moreover, the reflectivity of the transparent conducting coating for P-polarized light is not less than 6%, the reflectivity of the enhanced reflection coating for P-polarized light is not less than 10%, and the reflectivity of the head up display glass for P-polarized light is not less than 15%, so that P-polarized light rays of an image that enters human eyes can be increased, and thus the reflectivity of the head up display glass for P-polarized light can be improved, thereby improving display sharpness of the head up display image, and enhancing head up display effect.

BRIEF DESCRIPTION OF THE DRAWINGS

In order to describe technical solutions in embodiments of the disclosure or in the related art more clearly, the following will give a brief introduction to accompanying drawings required for describing the embodiments or the related art. Apparently, the accompanying drawings hereinafter described merely illustrate some embodiments of the disclosure. Based on the accompanying drawings, those of ordinary skills in the art can also obtain other drawings without creative effort.

Reference signs in the accompanying drawings are described as follows:

10—outer glass sheet, 11—first surface, 12—second surface;

20—inner glass sheet, 21—third surface, 22—fourth surface;

30—intermediate layer;

40—transparent conducting coating, 41a, 41b, 41c, 41d—dielectric layer, 42a, 42b, 42c—metal layer;

50—enhanced reflection coating, 51, 51a, 51b—high refractive-index layer, 52, 52a, 52b—low refractive-index layer, 53—connection layer;

60—projection unit;

100—human eyes.

DETAILED DESCRIPTION

The technical solutions in embodiments of the disclosure are clearly and completely described hereinafter with reference to accompanying drawings in the embodiments of the disclosure. Apparently, the described embodiments are merely part of rather than all of the embodiments of the disclosure. All other embodiments obtained by those of ordinary skill in the art based on the embodiments provided herein without creative efforts shall fall within the scope of the disclosure.

Figure 1:
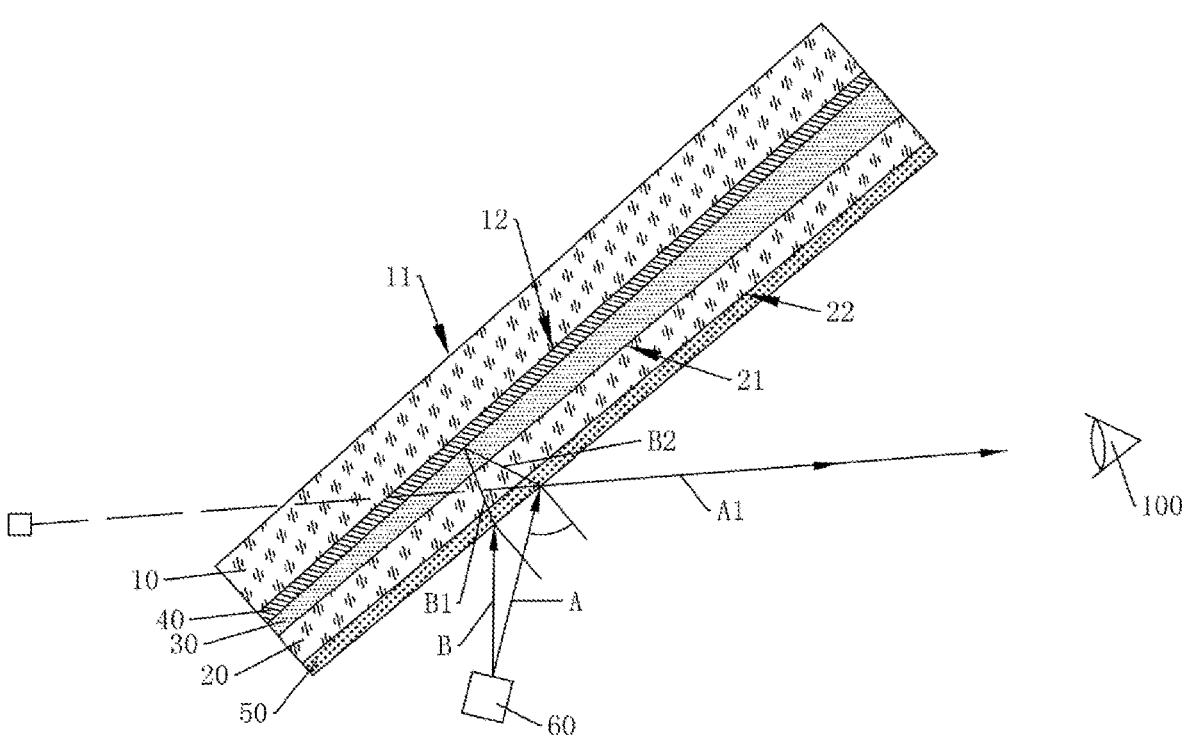
FIG. 1 is a schematic diagram of a head up display system in an embodiment.

Referring to FIG. 1, a head up display system in an embodiment of the disclosure includes a projection unit 60 and a head up display glass provided in embodiments of the disclosure. In an embodiment, the head up display glass is mounted to a vehicle, and the head up display glass includes an outer glass sheet 10, a transparent conducting coating 40, an intermediate layer 30, an inner glass sheet 20, and an enhanced reflection coating 50 arranged sequentially in a direction from the outside of the vehicle to the inside of the vehicle. The projection unit 60 is configured to generate P-polarized light that is incident on the enhanced reflection coating 50 at an angle of incidence ranging from 55° to 75°. The angle of incidence is an angle between an incident direction of the P-polarized light and a normal of a surface of the enhanced reflection coating 50, and for example, generally, the angle of incidence is about 64°.

Specifically, both a first light ray A and a second light ray B emitted from the projection unit 60 are reflected and refracted by the enhanced reflection coating 50. The first light ray A is reflected by the enhanced reflection coating 50 to generate a primary reflected light ray A1, and the primary reflected light ray A1 enters human eyes 100 to form a first head up display image. The first light ray A is refracted by the enhanced reflection coating 50 to generate a primary refracted light ray (not illustrated). The primary refracted light ray enters the inside of the head up display glass and then exits the enhanced reflection coating 50, and thus does not enter the human eyes 100 and may not be observed by the human eyes 100. The second light ray B is refracted by the enhanced reflection coating 50 to generate a primary refracted light ray B1. The primary refracted light ray B1 passes through the inner glass sheet 20 and the intermediate layer 30 to reach the transparent conducting coating 40, and then is reflected by the transparent conducting coating 40 to generate a secondary reflected light ray B2. At least part of the secondary reflected light ray B2 passes through the intermediate layer 30, the inner glass sheet and the enhanced reflection coating 50 and then enters the human eyes to form a second head up display image. The primary refracted light ray B1 is refracted by the transparent conducting coating 40 to generate a secondary refracted light ray (not illustrated), and the secondary refracted light ray passes through the outer glass sheet 10 and is transmitted to the outside of the vehicle. The second light ray B is reflected by the enhanced reflection coating 50 to generate a primary reflected light ray (not illustrated), and thus the primary reflected light ray does not enter the human eyes 100 and may not be observed by the human eyes 100. That is, an image projected by the projection unit 60 is reflected by the enhanced reflection coating 50 to form the first head up display image serving as a primary image, and is refracted by the enhanced reflection coating 50 and then reflected by the transparent conducting coating 40 to form the second head up display image serving as a secondary image. The head up display glass of the disclosure enables at least part of the first head up display image to superimpose at least part of the second head up display image, so that increased light rays of the primary image can be observed by the human eyes 100, thereby improving brightness of the primary image while weakening and even eliminating visual ghosting formed by the secondary image. Preferably, at least 80%, such as 85% and 90%, more preferably 100%, area of the first head up display image superimposes at least 80%, such as 85% and 90%, more preferably 100%, area of the second head up display image.

The projection unit 60 is configured to generate P-polarized light. The projection unit is configured to output, on the head up display glass, relevant texts and image information, such as speed, engine revolutions per minute (rpm), fuel consumption, tire pressure, dynamic navigation, night vision, or live map, which then can be observed by the human eyes 100 in the vehicle, therefore implementing head up display, and even implementing augmented reality (AR)-head up display. A position of the projection unit 60 and an angle of incidence of the P-polarized light are adjustable to be adapted to different positions or heights of observers in the vehicle. In the disclosure, a proportion of the P-polarized light in light rays generated by the projection unit 60 is greater than or equal to 80%, more preferably the proportion of the P-polarized light in light rays generated by the projection unit 60 is greater than or equal to 90%, or even the proportion of the P-polarized light in light rays generated by the projection unit 60 is 100%.

A vehicle is further provided in embodiments of the disclosure. The vehicle includes a vehicle body and the head up display system in the embodiments of the disclosure. The head up display glass is mounted to the vehicle body, and the projection unit 60 is disposed in the vehicle body.

In FIG. 1, the outer glass sheet 10 includes a first surface 11 and a second surface 12 opposite the first surface 11. The inner glass sheet 20 includes a third surface 21 and a fourth surface 22 opposite the third surface 21. The first surface 11 faces the outside of the vehicle. The second surface 12 is opposite to the third surface 21. The fourth surface 22 faces the inside of the vehicle. The intermediate layer 30 is disposed between the second surface 12 and the third surface 21. The transparent conducting coating 40 is disposed on the second surface 12. The enhanced reflection coating 50 is disposed on the fourth surface 22.

Figure 2:
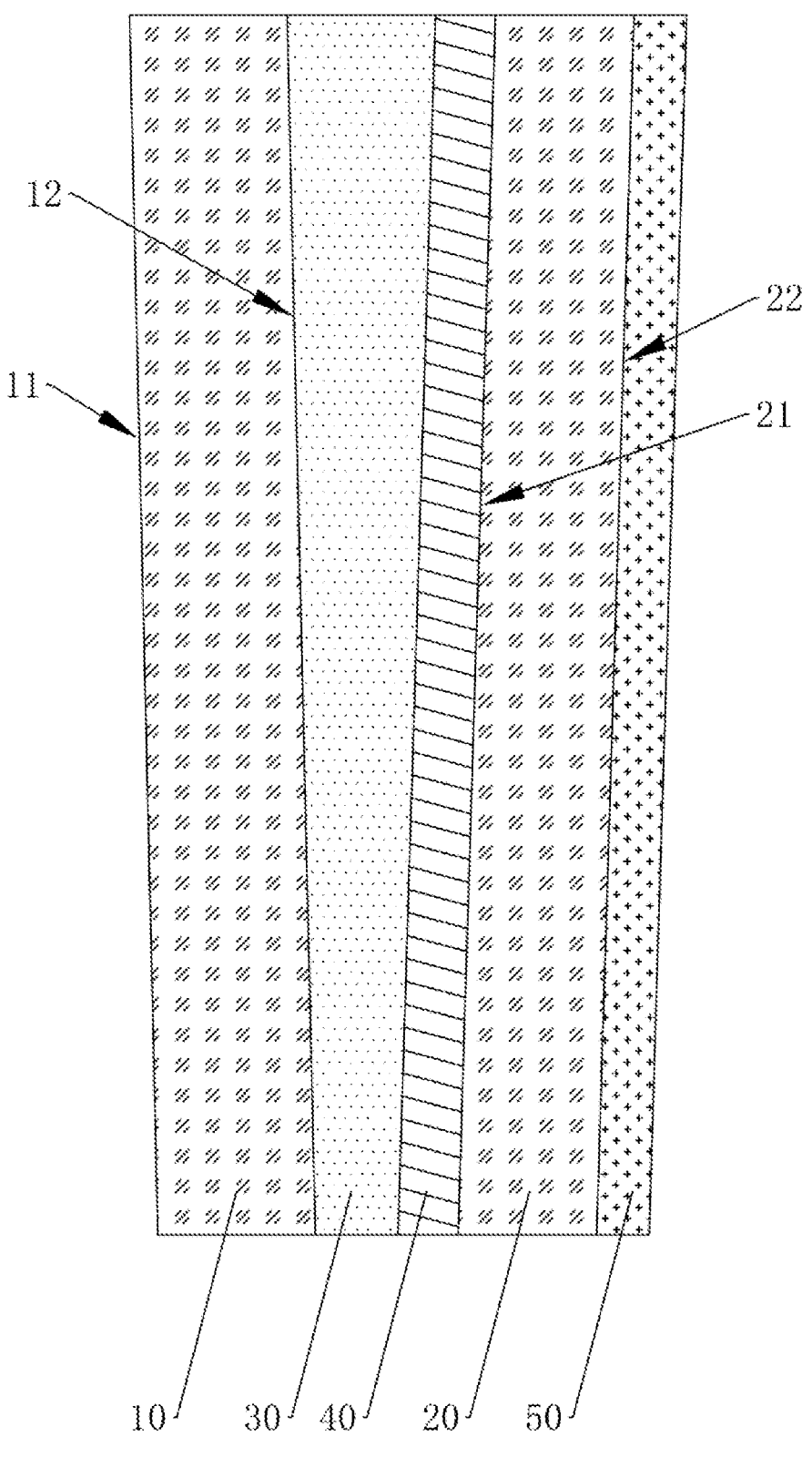
FIG. 2 is a schematic diagram of a head up display glass in an embodiment.

FIG. 2 illustrates another embodiment, which is substantially the same as the embodiment illustrated in FIG. 1, except that the transparent conducting coating 40 is disposed on the third surface 21.

Each of the transparent conducting coating 40 and the enhanced reflection coating 50 is made of a transparent nano coating, has a visible light transmittance greater than or equal to 70%, can reflect P-polarized light, and have other functions. The transparent conducting coating and the enhanced reflection coating 50 each may be deposited on the second surface 12, the third surface 21, or the fourth surface 22 through vapor deposition. For example, the transparent conducting coating 40 may be deposited on the second surface 12 or the third surface 21 through magnetron sputtering, and the enhanced reflection coating 50 may be deposited on the fourth surface 22 through magnetron sputtering.

With reference to the embodiments in FIG. 1 and FIG. 2, the transparent conducting coating 40 includes multiple metal layers and thus can reflect infrared light. The transparent conducting coating 40 has high visible light transmittance and high infrared light reflectivity, and thus has significantly good heat insulation effect and a good light transmittance performance. Therefore, the head up display glass of the disclosure has not only a head up display function but also a heat insulation function and a good light transmittance performance.

The transparent conducting coating 40 has a reflectivity for P-polarized light not less than 6%. Optionally, the reflectivity of the transparent conducting coating 40 for P-polarized light is not less than 9%. Optionally, the reflectivity of the transparent conducting coating 40 for P-polarized light may be 6%, 7%, 8%, 9%, 10%, 11%, 12%, 13%, 14%, 15%, 16%, 17%, 18%, 19%, 20%, etc. The enhanced reflection coating 50 has a reflectivity for P-polarized light not less than 10%. Optionally, the reflectivity of the enhanced reflection coating 50 for P-polarized light is not less than 14%. Optionally, the reflectivity of the enhanced reflection coating 50 for P-polarized light may be 10%, 11%, 12%, 13%, 14%, 15%, 16%, 17%, 18%, 19%, 20%, 21%, 22%, 23%, 24%, 25%, 30%, etc. The head up display glass enables at least part of the first head up display image to superimpose at least part of the second head up display image. The head up display glass has a reflectivity for P-polarized light not less than 15%. Optionally, the reflectivity of the head up display glass for P-polarized light is not less than 19%. Optionally, the reflectivity of the head up display glass for P-polarized light may be 15%, 16%, 17%, 18%, 19%, 20%, 21%, 22%, 23%, 24%, 25%, 26%, 27%, 28%, 29%, 30%, 31%, 32%, 33%, 34%, 35%, 40%, etc.

Specifically, with reference to FIG. 1 and FIG. 2, the reflectivity of the head up display glass for P-polarized light is measured when P-polarized light is incident on a side of the enhanced reflection coating 50 at an angle of incidence (for example, 64°) in practical use. The reflectivity describes a ratio between reflected light rays and all incident light rays. P-polarized light has a wavelength ranging from 380 nm to 780 nm, a reflection spectrum is drawn according to the wavelength, and the reflectivity for P-polarized light is calculated according to international organization for standardization (ISO) 9050. The reflectivity of the transparent conducting coating 40 for P-polarized light can be determined by simulating or measuring a reflectivity of a comparative glass sheet that includes a transparent conducting coating but no enhanced reflection coating. The reflectivity of the enhanced reflection coating 50 for P-polarized light can be determined by simulating or measuring a reflectivity of a comparative glass sheet that includes an enhanced reflection coating but no transparent conducting coating. Both the reflectivity of the transparent conducting coating 40 for P-polarized light and the reflectivity of the enhanced reflection coating 50 for P-polarized light are determined under the same experimental conditions as for determining the reflectivity of head up display glasses for P-polarized light.

In embodiments of the disclosure, the P-polarized light can be reflected by the enhanced reflection coating 50 to form the first head up display image that serves as a primary image, and can be refracted by the enhanced reflection coating 50 and be reflected by the transparent conducting coating 40 to form the second head up display image that serves as a secondary image, so that the primary image can superimpose the secondary image, thereby increasing P-polarized light rays of a head up display image that enters the human eyes. Moreover, the reflectivity R1 of the transparent conducting coating 40 for P-polarized light is not less than 6%, and the reflectivity R2 of the enhanced reflection coating 50 for P-polarized light is not less than 10%. The reflectivity R3 of the head up display glass for P-polarized light satisfies: R3≥R2+10%*R1, preferably R3≥R2+ 20%*R1, more preferably R3≥R2+30%*R1, or even R3≥R2+40%*R1, or may satisfy: R3≥R2+50%*R1 at certain angles of incidence, so that P-polarized light rays of an image that enters the human eyes can be increased, and thus the reflectivity of the head up display glass for P-polarized light can be improved, thereby improving display brightness and sharpness of the head up display image projected, and enhancing display effect.

Figure 3:
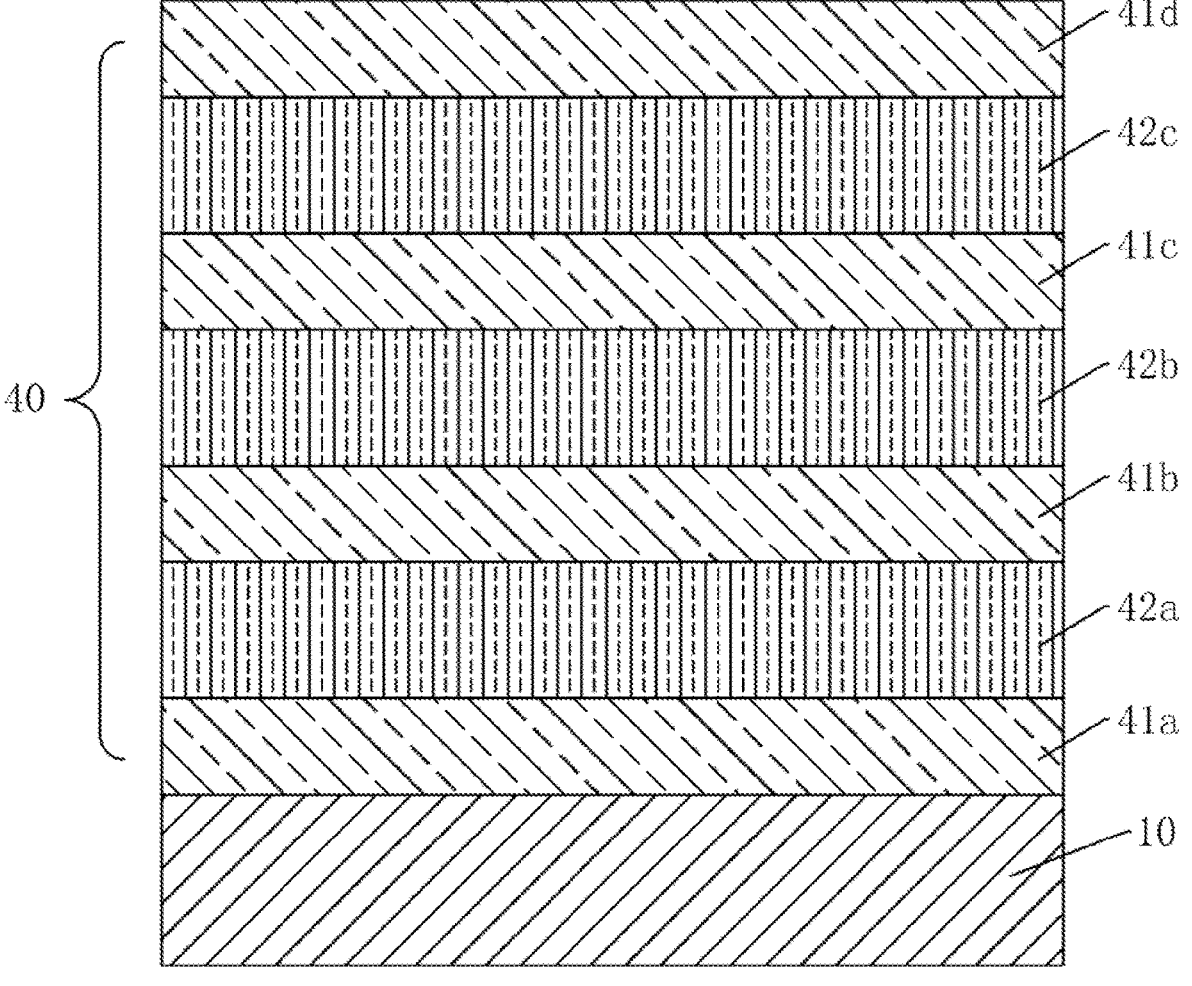
FIG. 3 is a schematic diagram of a transparent conducting coating in an embodiment.

Referring to FIG. 3, in an embodiment, the transparent conducting coating 40 includes multiple dielectric layers and multiple metal layers. The number (quantity) of metal layers is not less than three, and each of the multiple metal layers is disposed between two of the multiple dielectric layers.

Specifically, the number of metal layers may be 3, 4, 5, etc. The number of dielectric layers may be at least one more than the number of metal layers, that is, the number of dielectric layers may be 4, 5, 6, etc. As illustrated in FIG. 1 and FIG. 3, take that the transparent conducting coating 40 is disposed on the outer glass sheet 10 as an example. A dielectric layer 41a, a metal layer 42a, a dielectric layer 41b, a metal layer 42b, a dielectric layer 41c, a metal layer 42c, and a dielectric layer 41d are deposited sequentially on the outer glass sheet 10. For example, the metal layer is made of silver (Ag), and thus the transparent conducting coating 40 may also be referred to as a three-silver-layer structure, a four-silver-layer structure, a five-silver-layer structure, etc. Metal layers, the number of which is not less than three, can provide better infrared reflection, thereby implementing better heat insulation. The metal layers can withstand subsequent high-temperature heat treatment or other bending processes under protection of the dielectric layers, and an optical performance of a head up display system obtained can meet a standard of automotive glasses.

Referring to FIG. 2, in the case where the transparent conducting coating 40 is disposed on the third surface 21 of the inner glass sheet 20, the structure of the transparent conducting coating 40 can refer to the above illustration, which will not be repeated herein.

The metal layer is made of any one metal or any one metal alloy of Ag, gold (Au), copper (Cu), aluminum (Al), or platinum (Pt). Furthermore, the metal layer is made of an alloy of Ag and at least one of Au, Cu, Al, or Pt.

The dielectric layer may be made of an oxide of at least one of zinc (Zn), magnesium (Mg), tin (Sn), titanium (Ti), niobium (Nb), zirconium (Zr), nickel (Ni), indium (In), Al, cerium (Ce), tungsten (W), molybdenum (Mo), antimony (Sb), bismuth (Bi), or silicon (Si), and/or a nitride, an oxynitride, or a mixture thereof of at least one of Si, Al, Zr, yttrium (Y), Ce, or lanthanum (La).

In an embodiment, the transparent conducting coating 40 is provided with at least two busbars. The at least two busbars are electrically connected to a power supply of 12 V to 60 V, to enable the transparent conducting coating 40 to generate heat.

The busbar can be a metal foil and/or a conductive silver paste. The metal foil is fixed on the transparent conducting coating 40 by adhesion, etc., and the metal foil may be a gold foil, a silver foil, a copper foil, an aluminum foil, etc. The conductive silver paste is directly disposed on the transparent conducting coating 40 to form the busbar by methods such as printing. The busbars may include a first busbar and a second busbar. The first busbar is connected to a positive electrode of a power supply, and the second busbar is connected to a negative electrode of the power supply. The first busbar and the second busbar are also in directly electrical contact with the transparent conducting coating 40, and thus a current of the power supply can be transmitted to the transparent conducting coating 40, so that the transparent conducting coating 40 can implement an electric heating function while implementing a heat insulation function of infrared reflection and a head up display function, thereby defrosting and defogging. Preferably, the transparent conducting coating 40 has a sheet resistance not greater than 1.2Ω/□, preferably the transparent conducting coating 40 has the sheet resistance ranging from 0.5Ω/□ to 0.9Ω/□.

Figure 4:
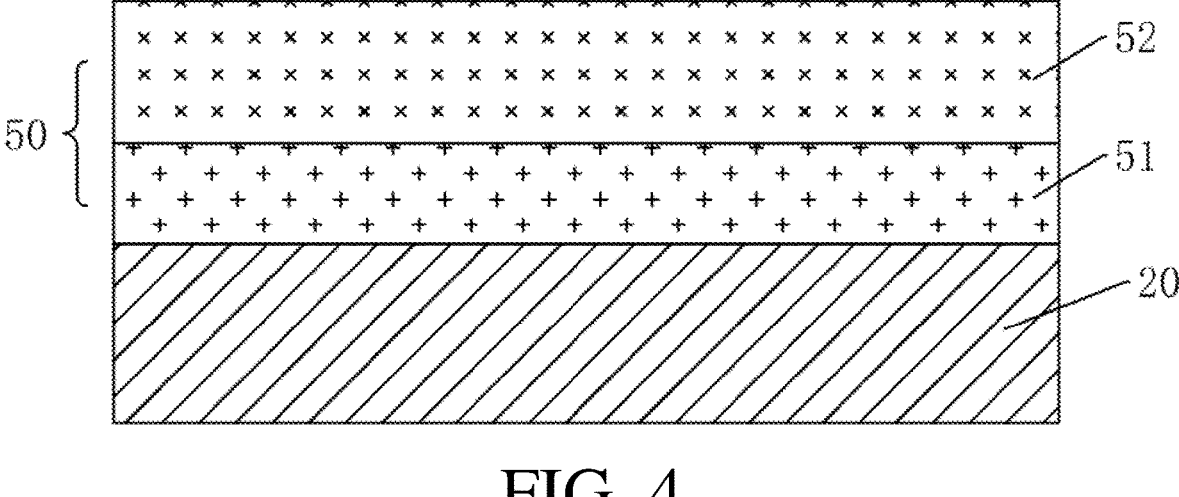
FIG. 4 is a schematic diagram of an enhanced reflection coating in an embodiment.

Referring to FIG. 1 and FIG. 4, in an embodiment, the enhanced reflection coating 50 includes a high refractive-index layer 51 and a low refractive-index layer 52 stacked sequentially in a direction from the fourth surface 22 to the inside of the vehicle. The high refractive-index layer 51 has a refractive index not less than 1.8. The low refractive-index layer 52 has a refractive index not greater than 1.6. A number of the high refractive-index layer is not less than one, a number of the low refractive-index layer is not less than one. The high refractive-index layer 51 and the low refractive-index layer 52 stacked sequentially can increase the reflectivity for P-polarized light while satisfying good light transmittance performance, thereby improving sharpness of the primary image.

Figure 5:
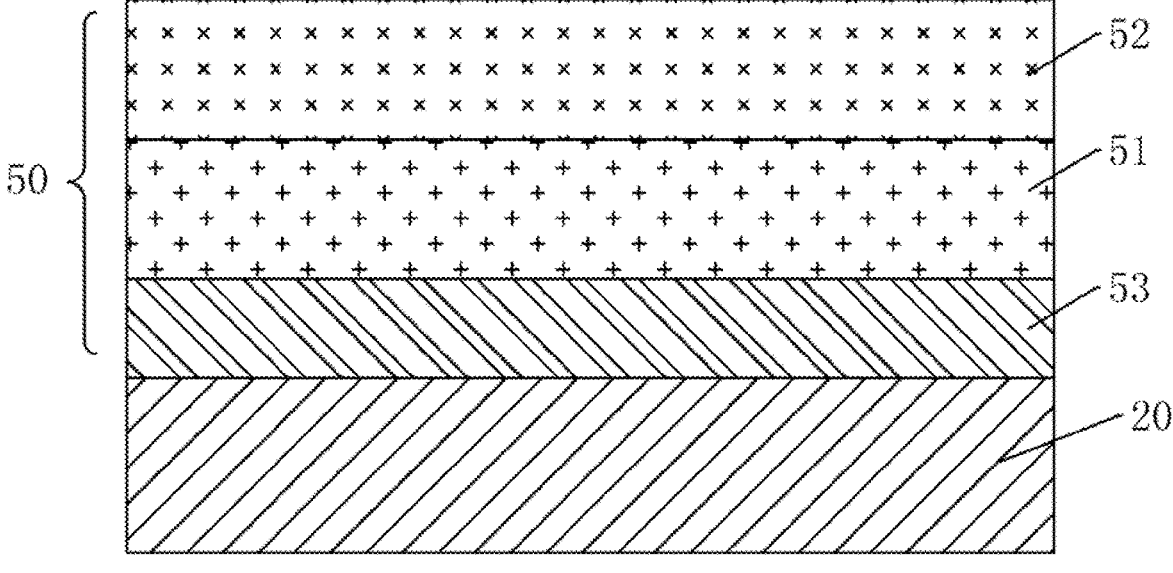
FIG. 5 is a schematic diagram of an enhanced reflection coating in an embodiment.

In an embodiment, referring to FIG. 5, the high refractive-index layer of the enhanced reflection coating 50 includes at least two high refractive-index sub-layers, i.e., a first high refractive-index sub-layer and a second high refractive-index sub-layer. The first high refractive-index sub-layer is closer to the fourth surface 22 than the second high refractive-index sub-layer. Preferably, the first high refractive-index sub-layer has a refractive index ranging from 1.9 to 2.2, and the second high refractive-index sub-layer has a refractive index greater than or equal to 2.3, so that the reflectivity of the enhanced reflection coating 50 for P-polarized light can be further increased, and a reflecting color of the enhanced reflection coating 50 can be made aesthetic. Optionally, the low refractive-index layer of the enhanced reflection coating 50 may include at least two low refractive-index sub-layers.

Figure 6:
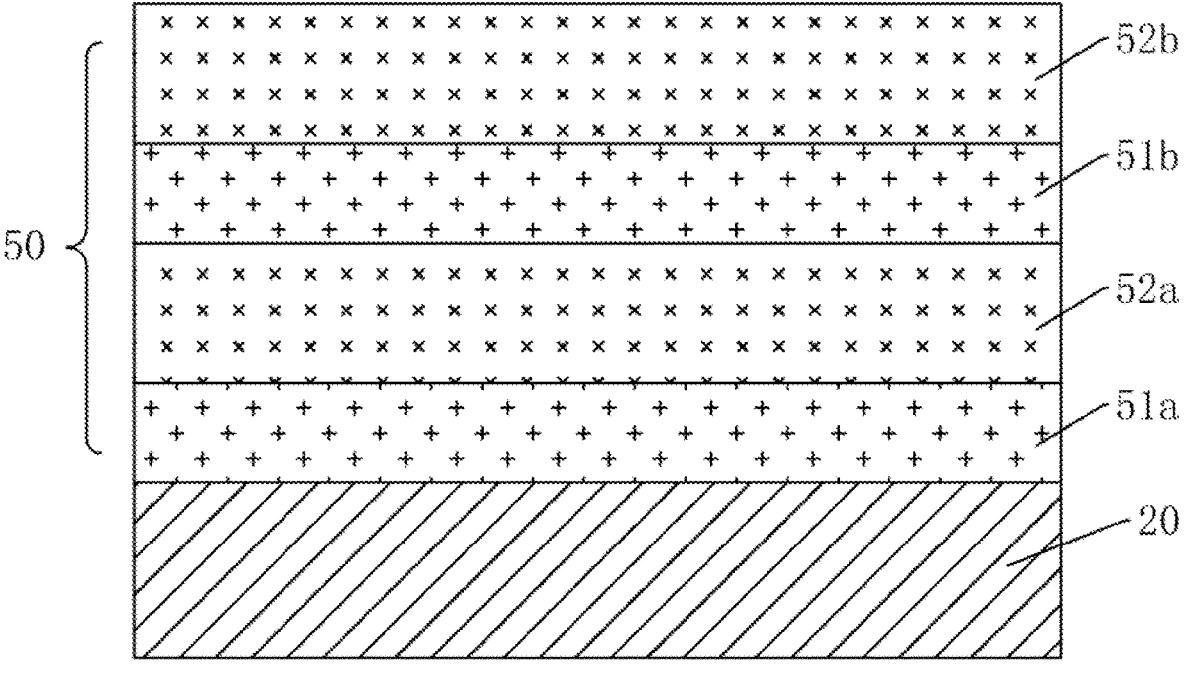
FIG. 6 is a schematic diagram of an enhanced reflection coating in an embodiment.

In an embodiment, referring to FIG. 6, there are multiple high refractive-index layers and multiple low refractive-index layers. The number of the high refractive-index layers and the number of the low refractive-index layers may be the same as each other and each may be 2, 3, 4, etc., and refractive indexes thereof may refer to the above illustration. In the embodiment illustrated in FIG. 6, there are two high refractive-index layers and two low refractive-index layers, i.e., a high refractive-index layer 51a, a low refractive-index layer 52a, a high refractive-index layer 51b, and a low refractive-index layer 52b that are stacked sequentially.

The intermediate layer 30 connects the outer glass sheet 10 to the inner glass sheet 20. In an embodiment, referring to FIG. 1 and FIG. 2, the intermediate layer 30 has a wedge-shaped cross-section. The wedge-shaped cross-section has a wedge angle ranging from 0.05 milli-radians (mrad) to 0.6 mrad. Specifically, the wedge angle may be 0.05 mrad, 0.1 mrad, 0.15 mrad, 0.18 mrad, 0.3 mrad, 0.4 mrad, 0.45 mrad, 0.5 mrad, 0.55 mrad, 0.6 mrad, etc. Optionally, the wedge angle ranges from 0.1 mrad to 0.18 mrad, and a projection distance (a distance between a head up display image and human eyes) of the head up display image is at least 10 meters, so that AR-head up display can be better implemented and even holographic projection imaging can be implemented inside and outside the vehicle. Optionally, the wedge angle ranges from 0.45 mrad to 0.55 mrad, so that head up display with a projection distance not longer than 5 meters can be better implemented. The intermediate layer 30 is set to be in a wedge shape, and the wedge angle is set to be in an appropriate range, so that at least part of the primary image formed through reflection of the enhanced reflection coating 50 can superimpose at least part of the secondary image formed through refraction of the enhanced reflection coating 50 and reflection of the transparent conducting coating 40, thereby enhancing display of the head up display image, and thus improving brightness and sharpness of the head up display image.

Optionally, a material of the intermediate layer 30 may be at least one of polycarbonate (PC), polyvinyl chloride (PVC), polyvinyl butyral (PVB), ethylene vinyl acetate (EVA), polyacrylate (PA), polymethyl methacrylate (PMMA), a sentry glass plus (SGP), or polyurethane (PU).

Optionally, an infrared absorbent or an ultraviolet (UV) absorbent is added to the material of the intermediate layer 30. The head up display glass can have better functions of sun protection and heat insulation with the infrared absorbent for infrared absorption. The head up display glass can have a function of UV isolation with the UV absorbent for UV absorption.

Optionally, the intermediate layer 30 is provided with a colored region (not illustrated). The colored region has a transparency less than other regions, and thus serves as a shadow band to reduce interference of sunlight on human eyes, thereby improving driving safety and comfort.

Optionally, the intermediate layer 30 includes multiple stacked sub-layers. The number of multiple sub-layers is not limited, and the multiple sub-layers may be made of the same material or different materials to implement various functions according to requirements.

One sub-layer of the multiple sub-layers has a plasticizer of a higher content than other sub-layers, so that the intermediate layer 30 has a significantly good sound insulation function.

In an embodiment, the outer glass sheet 10 is a tinted glass sheet having a visible light transmittance not less than 70%. Optionally, the outer glass sheet 10 is a green glass sheet and can absorb part of P-polarized light refracted by the transparent conducting coating 40, thereby further improving quality of a head up display image. Optionally, the outer glass sheet 10 may also be a clear glass sheet.

In an embodiment, the inner glass sheet 20 is a clear glass sheet having a visible light transmittance not less than 90%, which can reduce absorption for P-polarized light refracted by the enhanced reflection coating 50, thereby further improving brightness of a head up display image.

The visible light transmittance of the outer glass sheet 10 and the visible light transmittance of the inner glass sheet 20 need to meet a national regulation that a visible light transmittance of a windshield of a vehicle is required to be greater than 70%. In the disclosure, the visible light transmittance of the outer glass sheet 10 and the visible light transmittance of the inner glass sheet 20 can meet the regulation with the above settings.

In an embodiment, the inner glass sheet 20 has a thickness not greater than 1.4 mm. Optionally, the thickness of the inner glass sheet 20 ranges from 0.3 mm to 1.2 mm. Specifically, the thickness of the inner glass sheet 20 may be 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, etc. In the embodiment illustrated in FIG. 2, the thickness of the inner glass sheet 20 is 1.1 mm. A ghosting offset distance between the primary image and the secondary image can be controlled to be imperceptible to human eyes by reducing the thickness of the inner glass sheet 20. In this case, a cross-section of the intermediate layer 30 is not limited to be wedge-shaped, and instead, can be rectangular, so that costs can be further reduced.

Optionally, referring to FIG. 1 and FIG. 2, the outer glass sheet 10 and the inner glass sheet 20 each may be a bent glass sheet that may be physically strengthened, chemically strengthened, or body strengthened. Physical strengthening mainly refers to high-temperature heat treatment of at least 560° C. followed by a bending on a glass sheet. Chemical strengthening mainly refers to exchange of ions with different ionic radii on the glass surface to produce a relatively high surface stress on a glass surface accompanied with a certain depth of a stress layer, and thus improve a mechanical strength of the glass sheet. Body strengthening mainly refers to direct combination of a float glass sheet and another glass sheet to form a laminated glass without physical strengthening or chemical strengthening, where quality of the laminated glass meets a standard of automotive laminated glasses, such as GB9656-2016 Automotive Safety Glass in China.

Embodiments

The following will list some embodiments of the disclosure for further illustration, where the disclosure is not limited to the following embodiments.

The following will illustrate head up display systems in examples 1 to 4 and comparative examples 1 to 4 of the disclosure. In each of examples 1 to 4 and comparative examples 1 to 4, a projection unit is a thin film transistor-liquid crystal display (TFT-LCD) projector with LED backlight, which can generate light rays including at least 99% P-polarized light and further includes multiple reflection mirrors. A display image with maximum sharpness can be observed by an observer by adjusting a position of the projection unit and an angle of incidence of P-polarized light.

In the disclosure, a head up display glass in each of examples 1 to 3 and comparative examples 1 and 2 is prepared according to an automotive glass production process, where zinc tin oxide (ZnSnO$_x$):Mg is Mg-doped ZnSnO$_x$, and zinc oxide (ZnO):Al is Al-doped ZnO.

Example 1

Head up display glass: outer glass sheet (2.1 mm clear glass sheet)/transparent conducting coating/0.76 mm wedge-shaped PVB/inner glass sheet (2.1 mm clear glass sheet)/enhanced reflection coating Transparent conducting coating: 2.1 mm clear glass sheet/ ZnSnO$_x$:Mg (15 nm)/ZnO:Al (11 nm)/Ag (12 nm)/ZnO:Al (23 nm)/titanium oxide (TiO$_x$) (2 nm)/ZnSnO$_x$:Mg (26 nm)/ ZnO:Al (26 nm)/Ag (13 nm)/ZnO:Al (23 nm)/TiO$_x$ (3 nm)/ ZnSnO$_x$:Mg (24 nm)/ZnO:Al (25 nm)/Ag (11 nm)/ZnO:Al (9 nm)/TiO$_x$ (2 nm)/ZnSnO$_x$:Mg (18 nm)/silicon nitride (SiN) (13 nm)

Wedge-shaped PVB: wedge angle is equal to 0.29 mrad

Enhanced reflection coating: 2.1 mm clear glass sheet/ ZnSnO$_x$:Mg (38 nm)/TiO$_x$ (58 nm)/silicon dioxide (SiO$_2$) (96 nm)

Example 2

Head up display glass: outer glass sheet (2.1 mm clear glass sheet)/transparent conducting coating/0.76 mm wedge-shaped PVB/inner glass sheet (1.1 mm clear glass sheet)/enhanced reflection coating

11

Transparent conducting coating: the transparent conducting coating in example 2 is the same as the transparent conducting coating in example 1.

Wedge-shaped PVB: a wedge angle is equal to 0.18 mrad.

Enhanced reflection coating: 1.1 mm clear glass sheet/ ZnSnO$_x$:Mg (38 nm)/TiO$_x$ (58 nm)/SiO$_2$ (96 nm)

Example 3

Head up display glass: outer glass sheet (2.1 mm clear glass sheet)/transparent conducting coating/0.76 mm uniform-thickness PVB/inner glass sheet (0.7 mm clear glass sheet)/enhanced reflection coating Transparent conducting coating: 2.1 mm clear glass sheet/ ZnSnO$_x$:Mg (16 nm)/ZnO:Al (11 nm)/Ag (9 nm)/ZnO:Al (22 nm)/TiO$_x$ (2 nm)/ZnSnO$_x$:Mg (26 nm)/ZnO:Al (27 nm)/ Ag (12 nm)/ZnO:Al (24 nm)/TiO$_x$ (3 nm)/ZnSnO$_x$:Mg (24 nm)/ZnO:Al (23 nm)/Ag (12 nm)/ZnO:Al (10 nm)/TiO$_x$ (2 nm)/ZnSnO$_x$:Mg (14 nm)/ZnO:Al (10 nm)/Ag (10 nm)/ ZnO:Al (20 nm)/TiO$_x$ (2 nm)/ZnSnO$_x$ (20 nm)/SiN (15 nm)

Uniform-thickness PVB: a wedge angle is equal to 0.

Enhanced reflection coating: 0.7 mm clear glass sheet/ ZnSnO$_x$:Mg (38 nm)/TiO$_x$ (58 nm)/SiO$_2$ (96 nm)

Comparative Example 1

Head up display glass: outer glass sheet (2.1 mm clear glass sheet)/transparent conducting coating/0.76 mm uniform-thickness PVB/inner glass sheet (2.1 mm clear glass sheet)

The transparent conducting coating in comparative example 1 is the same as the transparent conducting coating in example 1, and does not have an enhanced reflection coating.

Comparative Example 2

Head up display glass: outer glass sheet (2.1 mm clear glass sheet)/0.76 mm uniform-thickness PVB/inner glass sheet (2.1 mm clear glass sheet)/enhanced reflection coating The enhanced reflection coating in comparative example 2 is the same as the enhanced reflection coating in example 1, and does not have a transparent conducting coating.

In each of examples 1 to 3 and comparative examples 1 and 2, the head up display system projects P-polarized light generated by the projection unit at a commonly used angle of incidence ranging from 60° to 70°. Whether a head up display image is clear and has no ghosting can be determined by visual observation. At the same time, a reflectivity of the head up display glass for P-polarized light in each of examples 1 to 3 and comparative examples 1 and 2 is recorded at every 1° intervals of the angle of incidence, and results are recorded in Table 1.

TABLE 1 reflectivity of head up display glasses for P-polarized light in examples 1 to 3 and comparative examples 1 and 2

| Angle of incidence | Comparative example 1 | Comparative example 2 | Example 1 | Example 2 | Example 3 |
|---|---|---|---|---|---|
| 60° | 9.16% | 14.32% | 19.09% | 19.88% | 21.19% |
| 61° | 9.22% | 15.68% | 19.47% | 20.12% | 21.88% |
| 62° | 9.38% | 16.95% | 20.01% | 20.72% | 22.50% |
| 63° | 9.52% | 18.43% | 21.71% | 22.40% | 24.12% |
| 64° | 9.61% | 20.20% | 23.46% | 24.01% | 25.98% |
| 65° | 10.65% | 20.21% | 23.49% | 24.21% | 26.09% |
| 66° | 12.11% | 21.00% | 24.03% | 24.74% | 26.41% |

12

TABLE 1-continued reflectivity of head up display glasses for P-polarized light in examples 1 to 3 and comparative examples 1 and 2

| Angle of incidence | Comparative example 1 | Comparative example 2 | Example 1 | Example 2 | Example 3 |
|---|---|---|---|---|---|
| 67° | 13.01% | 21.88% | 24.55% | 25.19% | 26.92% |
| 68° | 13.88% | 22.90% | 24.70% | 25.75% | 27.03% |
| 69° | 14.89% | 24.67% | 26.38% | 26.56% | 27.32% |
| 70° | 15.92% | 24.92% | 26.59% | 26.71% | 27.72% |

Figure 7:
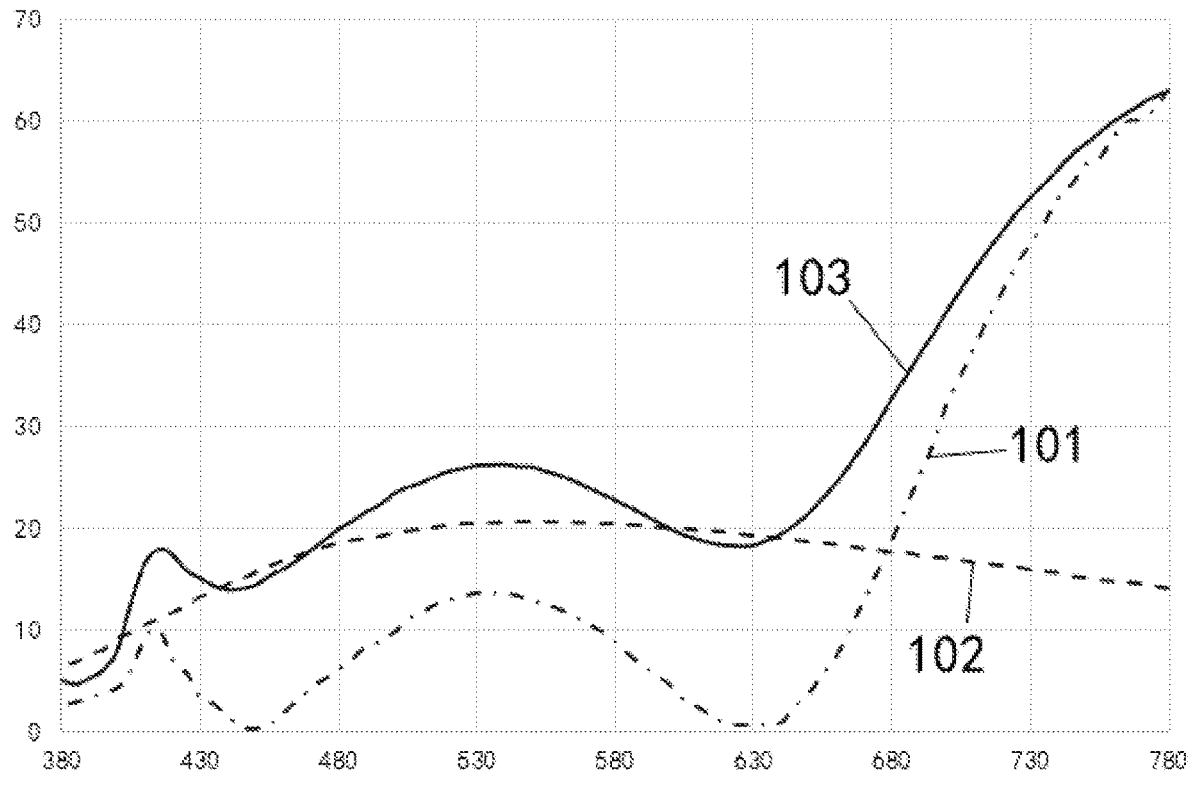
FIG. 7 is a graph of reflection spectrum curves of head up display glasses.

As illustrated in FIG. 7, in each of comparative examples 1 and 2 and example 1, a reflection spectrum of P-polarized light that has a wavelength ranging from 380 nm to 780 nm and is incident at an angle of incidence of 64° is recorded. A horizontal axis in FIG. 7 represents a wavelength (unit is nm), and a vertical axis in FIG. 7 represents a reflectivity for P-polarized light (unit is %). Curve 101 is a reflection spectrum curve of P-polarized light in comparative example 1, curve 102 is a reflection spectrum curve of P-polarized light in comparative example 2, and curve 103 is a reflection spectrum curve of P-polarized light in example 1.

As can be seen from Table 1 and FIG. 7 that, the reflectivity of the head up display glass for P-polarized light in each of examples 1 to 3 is greater than or equal to the sum of the reflectivity of the enhanced reflection coating for P-polarized light in comparative example 2 and 10% of the reflectivity of the transparent conducting coating for P-polarized light in comparative example 1. In the case where P-polarized light is incident at an angle of incidence ranging from 60° to 67°, the reflectivity of the head up display glass for P-polarized light in each of examples 1 to 3 is greater than or equal to the sum of the reflectivity of the enhanced reflection coating for P-polarized light in comparative example 2 and 20% of the reflectivity of the transparent conducting coating for P-polarized light in comparative example 1. In the case where P-polarized light is incident at an angle of incidence ranging from 60° to 65°, the reflectivity of the head up display glass for P-polarized light in each of examples 1 to 3 is greater than or equal to the sum of the reflectivity of the enhanced reflection coating for P-polarized light in comparative example 2 and 30% of the reflectivity of the transparent conducting coating for P-polarized light in comparative example 1. As such, at least part of the primary image of the head up display image can superimpose at least part of the secondary image of the head up display image, thereby improving display brightness and sharpness of the head up display image projected, and enhancing display effect.

In FIG. 7, in comparative example 1, the reflectivity for P-polarized light of 455 nm and 630 nm is minimum. Compared with comparative example 1, in example 1, the reflectivity of the head up display glass for P-polarized light of 455 nm and 630 nm can be significantly improved, and thus the reflection spectrum of the head up display glass in example 1 is more flat for P-polarized light of 455 nm to 630 nm, and in particular, the reflectivity of the head up display glass for P-polarized light of 530 nm to 550 nm in example 1 is significantly greater than that in comparative example 1 and that in comparative example 2.

Compared with example 1, in example 2 and example 3, a thinner inner glass sheet, for example, a clear glass sheet of 1.1 mm or 0.7 mm, is used, so that visual invisibility of a secondary image of a head up display image can be achieved, and thus the reflectivity of the head up display glass for P-polarized light can be further improved. Moreover, costs can be further reduced by using a wedge-shaped intermediate layer with a smaller wedge angle or even a uniform-thickness intermediate layer with a wedge angle of 0.

Comparing with example 1, in example 3, the reflectivity of the head up display glass for P-polarized light can be further improved by increasing the number of metal layers in the transparent conducting coating.

In each of examples 1 to 3 and comparative examples 1 and 2, the head up display system projects P-polarized light generated by the projection unit at an angle of incidence of 64° to generate a head up display image with a projection distance of 2.5 meters and a head up display image with a projection distance of 10 meters. Whether the head up display image is clear and has no ghosting can be determined by visual observation, a visible light transmittance (TL) and a transmission of total solar energy (TTS) can be calculated according to ISO9050, and results are illustrated in Table 2.

TABLE 2

| | quality of head up display images in examples 1 to 3 and comparative examples 1 and 2 | | | | |
|---|---|---|---|---|---|
| | Comparative example 1 | Comparative example 2 | Example 1 | Example 2 | Example 3 |
| TL | 74.67% | 82.45% | 70.92% | 71.28% | 70.61% |
| TTS | 40.58% | 63.72% | 37.46% | 38.58% | 36.74% |
| Head up display image with a projection distance of 2.5 meters | Clear, no ghosting, relatively dark | Clear, no ghosting, slightly dark | Clear, no ghosting, bright | Clear, no ghosting, bright | Clear, slight ghosting, bright |
| Head up display image with a projection distance of 10 meters | Vague, no ghosting, relatively dark | Vague, no ghosting, slightly dark | Clear, no ghosting, bright | Clear, no ghosting, bright | Clear, no ghosting, bright |

As can be seen from Table 2 that, compared with comparative examples 1 and 2, in examples 1 to 3, the head up display glass can have significantly good heat insulation effect and good light transmittance performance while achieving higher brightness of the head up display image, thereby better satisfying requirements of an automotive glass, such as safety and comfort.

In examples 1 to 3, AR-head up display (a projection distance≥10 meters) can also be implemented on the basis of implementing higher quality of common head up display (a projection distance≤5 meters). Furthermore, in examples 1 and 2, a common head up display image and an AR head up display image can be well displayed at the same time.

In the disclosure, a head up display glass in each of example 4 and comparative examples 3 and 4 is prepared according to an automotive glass production process, where $ZnSnO_x$:Mg is Mg-doped $ZnSnO_x$, and ZnO:Al is Al-doped ZnO.

Example 4

Head up display glass: outer glass sheet (2.1 mm clear glass sheet)/transparent conducting coating/0.76 mm wedge-shaped PVB/inner glass sheet (1.8 mm clear glass sheet)/enhanced reflection coating Transparent conducting coating: 2.1 mm clear glass sheet/ $ZnSnO_x$:Mg (30 nm)/ZnO:Al (16 nm)/Ag (10.5 nm)/ZnO:Al (10 nm)/$ZnSnO_x$:Mg (55 nm)/ZnO:Al (11 nm)/Ag (11 nm)/

ZnO:Al (9 nm)/$ZnSnO_x$:Mg (56 nm)/ZnO:Al (8 nm)/Ag (12 nm)/ZnO:Al (12 nm)/$TiO_x$ (5.5 nm)/$ZnSnO_x$:Mg (19.5 nm)/SiN (8 nm)

Wedge-shaped PVB: a wedge angle is equal to 0.26 mrad.

Enhanced reflection coating: 1.8 mm clear glass sheet/$ZnSnO_x$:Mg (38 nm)/$TiO_x$ (58 nm)/$SiO_2$ (96 nm)

Comparative Example 3

Head up display glass: outer glass sheet (2.1 mm clear glass sheet)/transparent conducting coating/0.76 mm uniform-thickness PVB/inner glass sheet (1.8 mm clear glass sheet)

The transparent conducting coating in comparative example 3 is the same as the transparent conducting coating in example 4, and does not have an enhanced reflection coating.

Comparative Example 4

Head up display glass: outer glass sheet (2.1 mm clear glass sheet)/0.76 mm uniform-thickness PVB/inner glass sheet (1.8 mm clear glass sheet)/enhanced reflection coating The enhanced reflection coating in comparative example 4 is the same as the enhanced reflection coating in example 4, and does not have a transparent conducting coating.

In each of example 4 and comparative examples 3 and 4, the head up display system projects P-polarized light generated by the projection unit at a commonly used angle of incidence ranging from 60° to 70°. Whether a head up display image is clear and has no ghosting can be determined by visual observation. At the same time, a reflectivity of the head up display glass for P-polarized light in each of example 4 and comparative examples 3 and 4 is recorded at every 1° intervals of the angle of incidence, and results are recorded in Table 3.

TABLE 3

| reflectivity of head up display glasses for P-polarized light in example 4 and comparative examples 3 and 4 | | | |
|---|---|---|---|
| Angle of incidence | Comparative example 3 | Comparative example 4 | Example 4 |
| 60° | 6.26% | 13.89% | 16.74% |
| 61° | 6.84% | 14.64% | 17.28% |
| 62° | 7.47% | 15.42% | 17.88% |
| 63° | 8.21% | 16.33% | 18.59% |
| 64° | 9.02% | 17.30% | 19.36% |
| 65° | 9.95% | 18.39% | 20.43% |
| 66° | 10.97% | 19.58% | 21.10% |
| 67° | 12.12% | 20.81% | 22.13% |
| 68° | 13.39% | 21.66% | 23.21% |
| 69° | 14.56% | 22.94% | 24.46% |
| 70° | 15.66% | 24.12% | 25.73% |

As can be seen from Table 3 that, the reflectivity of the head up display glass for P-polarized light in example 4 is greater than or equal to the sum of the reflectivity of the enhanced reflection coating for P-polarized light in comparative example 4 and 10% of the reflectivity of the transparent conducting coating for P-polarized light in comparative example 3. In the case where P-polarized light is incident at an angle of incidence ranging from 60° to 65°, the reflectivity of the head up display glass for P-polarized light in example 4 is greater than or equal to the sum of the reflectivity of the enhanced reflection coating for P-polarized light in comparative example 4 and 20% of the reflectivity of the transparent conducting coating for P-polarized light in comparative example 3. As such, at least part of the primary image of the head up display image can superimpose at least part of the secondary image of the head up display image, thereby improving display brightness and sharpness of the head up display image projected, and enhancing display effect.

In each of example 4 and comparative examples 3 and 4, the head up display system projects P-polarized light generated by the projection unit at an angle of incidence of 64° to generate a head up display image with a projection distance of 2.5 meters and a head up display image with a projection distance of 10 meters. Whether the head up display image is clear and has no ghosting can be determined by visual observation, and a TL and a TTS can be calculated according to ISO9050, and results are illustrated in Table 4.

TABLE 4

| quality of head up display images in example 4 and comparative examples 3 and 4 | | | |
| --- | --- | --- | --- |
| | Comparative example 3 | Comparative example 4 | Example 4 |
| TL | 73.24% | 81.55% | 71.82% |
| TTS | 39.20% | 63.93% | 37.28% |
| Head up display image with a projection distance of 2.5 meters | Clear, no ghosting, relatively dark | Clear, no ghosting, slightly dark | Clear, no ghosting, bright |
| Head up display image with a projection distance of 10 meters | Vague, no ghosting, relatively dark | Vague, no ghosting, slightly dark | Clear, no ghosting, bright |

As can be seen from Table 4, compared with comparative examples 3 and 4, in example 4, the head up display glass can have significantly good heat insulation effect and a good light transmittance performance while achieving higher brightness of the head up display image, thereby better satisfying requirements of an automotive glass, such as safety and comfort.

In example 4, AR-head up display (a projection distance≥10 meters) can also be implemented on the basis of implementing higher quality of common head up display (a projection distance≤5 meters). Furthermore, in example 4, a common head up display image and an AR head up display image can be well displayed at the same time.

The above embodiments are merely some embodiments of the disclosure, and the above embodiments cannot limit the scope of the disclosure. The ordinary skill in the field can understand all or a part of the process that realizes the above embodiments of the disclosure, and equivalent changes made in accordance with the claims of the disclosure still belong to the scope of the disclosure covered.

What is claimed is:

1. A head up display glass, comprising an outer glass sheet, an inner glass sheet, an intermediate layer, a transparent conducting coating, and an enhanced reflection coating, wherein the outer glass sheet has a first surface and a second surface opposite the first surface, the inner glass sheet has a third surface and a fourth surface opposite the third surface, the second surface faces the third surface, the intermediate layer is disposed between the second surface and the third surface, the transparent conducting coating is disposed on the second surface or the third surface, and the enhanced reflection coating is disposed on the fourth surface; and wherein the transparent conducting coating has a reflectivity for P-polarized light not less than 6%, the enhanced reflection coating has a reflectivity for P-polarized light not less than 10%, and the head up display glass has a reflectivity for P-polarized light not less than 15%.

2. The head up display glass of claim 1, wherein the transparent conducting coating comprises a plurality of dielectric layers and a plurality of metal layers, wherein a number of the plurality of metal layers is not less than three, and each of the plurality of metal layers is disposed between two of the plurality of dielectric layers.

3. The head up display glass of claim 2, wherein the metal layer is made of any one metal or any one metal alloy of silver (Ag), gold (Au), copper (Cu), aluminum (Al), or platinum (Pt).

4. The head up display glass of claim 1, wherein the transparent conducting coating is provided with at least two busbars, wherein the at least two busbars are electrically connected to a power supply of 12 V to 60 V, to enable the transparent conducting coating to generate heat.

5. The head up display glass of claim 1, wherein the transparent conducting coating has a sheet resistance ranging from 0.5 $\Omega/\square$ to 0.9 $\Omega/\square$.

6. The head up display glass of claim 1, wherein the enhanced reflection coating comprises a high refractive-index layer and a low refractive-index layer stacked sequentially outwards from the fourth surface, wherein the high refractive-index layer has a refractive index not less than 1.8, and the low refractive-index layer has a refractive index not greater than 1.6.

7. The head up display glass of claim 6, wherein a number of the high refractive-index layer is not less than one, and at least one of the high refractive-index layer comprises two high refractive-index sub-layers, wherein one of the two high refractive-index sub-layers has a refractive index ranging from 1.9 to 2.2, and the other of the two high refractive-index sub-layers has a refractive index greater than or equal to 2.3.

8. The head up display glass of claim 6, wherein a number of the high refractive-index layer is not less than one, at least one of the high refractive-index layer comprises at least two high refractive-index sub-layers, a number of the low refractive-index layer is not less than one, and at least one of the low refractive-index layer comprises at least two low refractive-index sub-layers.

9. The head up display glass of claim 1, wherein the intermediate layer has a wedge-shaped cross section, wherein the wedge-shaped cross section has a wedge angle ranging from 0.05 milli-radians (mrad) to 0.6 mrad.

10. The head up display glass of claim 9, wherein the wedge angle of the wedge-shaped cross section ranges from 0.1 mrad to 0.18 mrad.

11. The head up display glass of claim 9, wherein the wedge angle of the wedge-shaped cross section ranges from 0.45 mrad to 0.55 mrad.

12. The head up display glass of claim 1, wherein the reflectivity of the transparent conducting coating for P-polarized light is R1, the reflectivity of the enhanced reflection coating for P-polarized light is R2, and the reflectivity of the head up display glass for P-polarized light is R3, wherein R3≥R2+10% * R1.

13. The head up display glass of claim 1, wherein the outer glass sheet is a tinted glass sheet having a visible light transmittance not less than 70%.

14. The head up display glass of claim 1, wherein the inner glass sheet is a clear glass sheet having a visible light transmittance not less than 90%.

15. The head up display glass of claim 1, wherein the inner glass sheet has a thickness not greater than 1.4 mm.

16. A head up display system, comprising a projection unit and a head up display glass, wherein the head up display glass comprises an outer glass sheet, an inner glass sheet, an intermediate layer, a transparent conducting coating, and an enhanced reflection coating, wherein the outer glass sheet has a first surface and a second surface opposite the first surface, the inner glass sheet has a third surface and a fourth surface opposite the third surface, the second surface faces the third surface, the intermediate layer is disposed between the second surface and the third surface, the transparent conducting coating is disposed on the second surface or the third surface, and the enhanced reflection coating is disposed on the fourth surface; and wherein the transparent conducting coating has a reflectivity for P-polarized light not less than 6%, the enhanced reflection coating has a reflectivity for P-polarized light not less than 10%, and the head up display glass has a reflectivity for P-polarized light not less than 15%; and the projection unit is configured to generate P-polarized light that is incident on the enhanced reflection coating at an angle of incidence ranging from 55° to 75°.

17. The display system of claim 16, wherein the head up display glass has a reflectivity for the P-polarized light not less than 19%.

18. The head up display system of claim 16, wherein a proportion of P-polarized light in light rays generated by the projection unit is 100%.

19. The head up display system of claim 16, wherein the P-polarized light is configured to be reflected by the enhanced reflection coating to form a first head up display image and is configured to be reflected by the transparent conducting coating to form a second head up display image, and the head up display glass enables at least 80% area of the first head up display image to superimpose at least 80% area of the second head up display image.

20. The head up display system of claim 16, wherein the projection unit is configured to generate, through the head up display glass, a head up display image with a projection distance not longer than 5 meters and a head up display image with a projection distance longer than or equal to 10 meters.

* * * * *